July 8, 1947.  J. E. GURVITCH  2,423,647

METHOD OF MAKING ARTICLES OF COMPRESSED AND IMPREGNATED WOOD

Filed July 14, 1943

Inventor
JOSEPH E. GURVITCH
By Samuel Scrivener Jr.
Attorney

Patented July 8, 1947

2,423,647

UNITED STATES PATENT OFFICE 2,423,647

METHOD OF MAKING ARTICLES OF COMPRESSED AND IMPREGNATED WOOD

Joseph E. Gurvitch, Hyattsville, Md., assignor to Engineering and Research Corporation, Riverdale, Md., a corporation of Maryland Application July 14, 1943, Serial No. 494,747

2 Claims. (Cl. 144—309)

This invention relates to the manufacture of articles formed of compressed wood which has been impregnated with a material which hardens and becomes substantially insoluble and infusible when subjected to heat.

In the art of making articles of impregnated and compressed material (hereinafter called "compreg") two useful methods are now known and practiced, which may be referred to as the cutting method and the molding method. In the former, wood veneers are impregnated, piled, and compressed and bonded together to form panels or slabs of "compreg." These slabs are then bonded together into blocks, and the blocks are carved, as by machining, to the size and shape of the article which is to be produced. There are many disadvantages inherent in this method of manufacture, although experience has shown that, to date, it produces the best results. One of the disadvantages is the obvious one of the waste of material involved in carving a block of "compreg" to the desired shape. A second disadvantage is that the strength in shear of articles produced by this method is not uniform throughout the article or in all directions therein. This results from the fact that in this method of manufacture pressure is exerted only in a direction at right angles to the faces of the superposed veneers, whereby maximum strength in shear parallel to the grain of the slabs is in a direction parallel to the direction of compression and the minimum strength in shear is at right angles to this direction. A third disadvantage is that the method involves three distinct operations, namely, the formation of the "compreg" slabs, the bonding of the slabs into a block, and the carving of the block. In the second, or molding, method the impregnated veneers are partially bonded together without compression, then carved, as by machining, into an article having the general shape of the finished article but being approximately twice the size thereof, and finally placed in a steel mold and subjected to heat and pressure in order to form an article of the desired size and shape and set the impregnating binder. The disadvantages of such a process include all of those mentioned hereinbefore and, in addition, expensive equipment is required in carrying out the process, which equipment must be changed whenever a new type or size of article is to be manufactured.

The present invention is a new method of making "compreg" articles which is not subject to the various disadvantages of known methods, including those set forth hereinbefore. Accordingly, one of the principal objects of the invention is to provide a method of making "compreg" articles in which only the exact amount of material required to make the finished article will be used, whereby the waste inherent in known methods will be obviated. Another object is the provision of a method of making "compreg" articles having uniform strength throughout and in all directions. A further object of the invention is to provide a method of making "compreg" articles in which the formation of the "compreg" material and the shaping thereof to the final, desired form are accomplished in a single operation. A still further object is to provide a method of making "compreg" articles which may be more cheaply and easily practiced than those now known, whereby increased and cheaper production is accomplished.

Other objects and features of novelty of the invention will be made apparent from the following description and the annexed drawings which, it will be understood, are only illustrative of the invention and impose no limitation thereon not imposed by the appended claims.

Referring to the drawings, in which similar reference characters refer to like parts, Fig. 1 illustrates the known way of making a propeller blade from "compreg";

The invention will be described as applied to the manufacture of a propeller blade, although its applicability to the manufacture of other devices will be apparent. In known useful methods of making "compreg" propeller blades, the "compreg" itself is first formed. This is done by impregnating wood veneers with a material (hereinafter called the "binder"), such as phenolformaldehyde, which hardens and becomes substantially insoluble and infusible upon the application of heat. These impregnated veneers are then piled in superposed relation and compressed by squeezing the pile between the heads of a straight-line high pressure press, the force of which is applied at right angles to the faces of the veneers. Heat is applied simultaneously with the pressure in order to set the binder.

Figure 1:
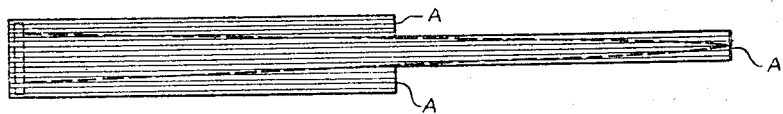

There is thus formed a slab of "compreg" which may be united with others, as by gluing or otherwise, to form a block of material of the form illustrated in Fig. 1 of the drawings, in which the various slabs are indicated at A. This block is then cut, as by machining, to the form of a propeller blade, as indicated by the broken line of Fig. 1.

In the practice of the method according to this invention I first cut wood veneers to such size and shape that when combined to form a preliminary article, by being superposed in face-to-face relation, and compressed in all directions by pressure applied over the entire exterior surface of the preliminary article, the preliminary article will be reduced to the predetermined size and shape of the finished article. Thus, the original total thickness of the veneers will be greater at all points than the thickness of the finished article at the corresponding point, because of the face-to-face compression thereof, while the original width and length of each veneer, whenever measured, will be greater than the width and length of the finished article at the corresponding place of measurement because of the lateral compression in the subsequent steps of the method.

After cutting to the desired size and shape, the wood veneers are separately impregnated with a binder, although it will be apparent that, if desired, the impregnation may be effected prior to shaping. The shaped and impregnated veneers are then piled in superposed, face-to-face relation as illustrated in Figs. 2 and 3, to form a body which, when compressed in all directions in subsequent steps of the method, will form a propeller blade of the desired size and shape.

Figure 2:
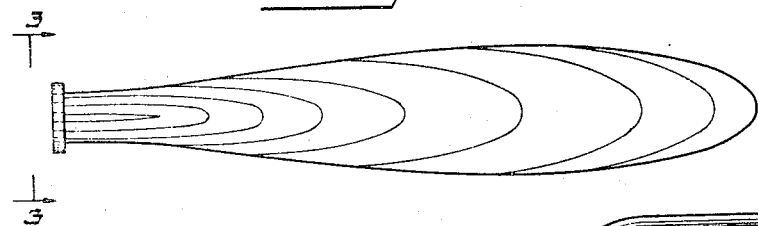
Figs. 2 and 3 are a plan view and an end view, respectively, of veneers arranged in accordance with a preliminary step of the invention to form a propeller blade.
Figure 3:
Figure 4:
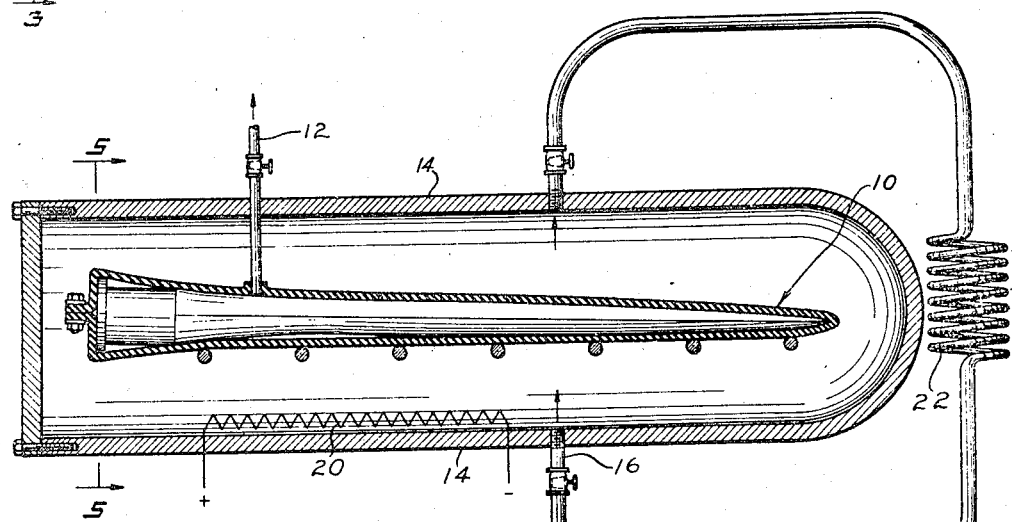
Fig. 4 is a vertical, longitudinal, partly sectional view of apparatus used in carrying out part of the method of the invention, and showing the application of fluid pressure to a propeller blade in all directions.
Figure 5:
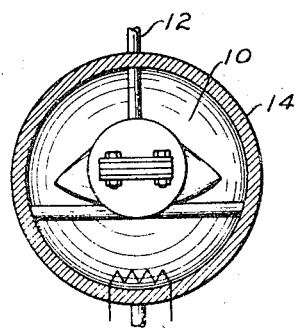
Fig. 5 is a view taken on line 5—5 of Fig. 4.

This oversize blade illustrated in Figs. 2 and 3 is placed in a flexible bag 10 having piping 12 through which the bag may be evacuated and the bag, with the oversize blade therein, is placed in a chamber 14 which may be sealed and which may be supplied, through pipe 16, with a liquid under very high pressure, for example of the order of 3000 pounds per square inch, all as illustrated in Figs. 4 and 5. The bag 10 is evacuated through pipe 12, causing the same to collapse on and tightly surround the blade, after which the pressure of the fluid in the autoclave or tank 14 is increased. The fluid completely surrounds the blade and exerts inward pressure thereon at every point of the exterior surface thereof, thereby compressing the veneers in all directions. The pressure of the fluid in the autoclave is increased to such a value and continued for such a time as is required to compress the blade in all directions to the final, desired size in each of such directions. Simultaneously with the application of fluid pressure to the blade heat is also applied to set the binder with which the veneers have been impregnated. This may be done in any desired manner, as by pre-heating the pressure fluid before introducing it into the autoclave or by means of heating coils 20 which in Figs. 4 and 5 are shown positioned within the autoclave. The application of heat and pressure will not only compress the article and set the binder but will also bond the veneers, thereby producing a unitary article. If desired, an adhesive may be applied between abutting faces of the veneer in order to facilitate bonding.

After the application of sufficient heat and pressure for a predetermined time, the blade is cooled by circulating the hydraulic fluid, under pressure, through cooling coils 22. The fluid is then drained from the autoclave, and the blade removed therefrom. It will be found that, if the original size and form of the parts have been properly chosen and if the proper temperature and pressure have been maintained within the autoclave, the finished blade will require only a minimum of finishing operations.

While I have described one series of steps according to my invention, it will be apparent to those skilled in the art that other steps, as well as modifications of those described, may be made part of the method without departing in any way from the spirit or scope of the invention, for the limits of which reference must be had to the appended claims.

I claim:

1. The method of manufacturing laminated wood articles, such as propellers, comprising the steps of first forming a plurality of wood veneers each having the approximate shape of one of the laminations of the final article but being of substantially greater dimensions throughout than said one of the laminations, superposing said pieces in face-to-face relation with adhesive between adjacent pieces to produce a preliminary article having the general shape of the final article which is to be produced and being materially larger in all dimensions than such final article, and subjecting said preliminary article to fluid pressure over its entire external surface to reduce the size of the article in all directions to the desired size of the final article, and heating the fluid to set the adhesive.

2. The method of manufacturing laminated wood articles, such as propellers, which consists in first forming a plurality of wood veneers each having the approximate shape of one of the laminations of the final article but being of substantially greater dimensions throughout than said one of the laminations, impregnating each of said pieces with a binder, superposing said pieces in face-to-face relation to produce a preliminary article having the general shape of the final article which is to be produced and being materially larger in all dimensions than such final article, and subjecting said preliminary article to fluid pressure of the order of 3000 pounds per square inch over its entire external surface to reduce the size of the article in all directions to the desired size of the final article, and heating the fluid to set the binder.

JOSEPH E. GURVITCH.

REFERENCES CITED

The following references are of record in the file of this patent:

UNITED STATES PATENTS

| Number | Name | Date |
|---|---|---|
| 2,073,290 | Teague | Mar. 9, 1937 |
| 2,201,706 | Sukohl | May 21, 1940 |
| 2,276,004 | Vidal et al. | Mar. 10, 1942 |
| 2,331,296 | Bendix | Oct. 12, 1943 |
| 2,295,454 | Cesare | Sept. 8, 1942 |
| 1,628,886 | Jackson et al. | May 17, 1927 |

FOREIGN PATENTS

| Number | Country | Date |
|---|---|---|
| 519,364 | Great Britain | Mar. 26, 1940 |
| 484,081 | Great Britain | May 29, 1938 |